Aug. 16, 1938.   C. S. JOHNSON ET AL   2,127,120
BATCHER, BATCH CHARGING, AND TRANSFER SYSTEM
Filed March 11, 1937   3 Sheets-Sheet 1
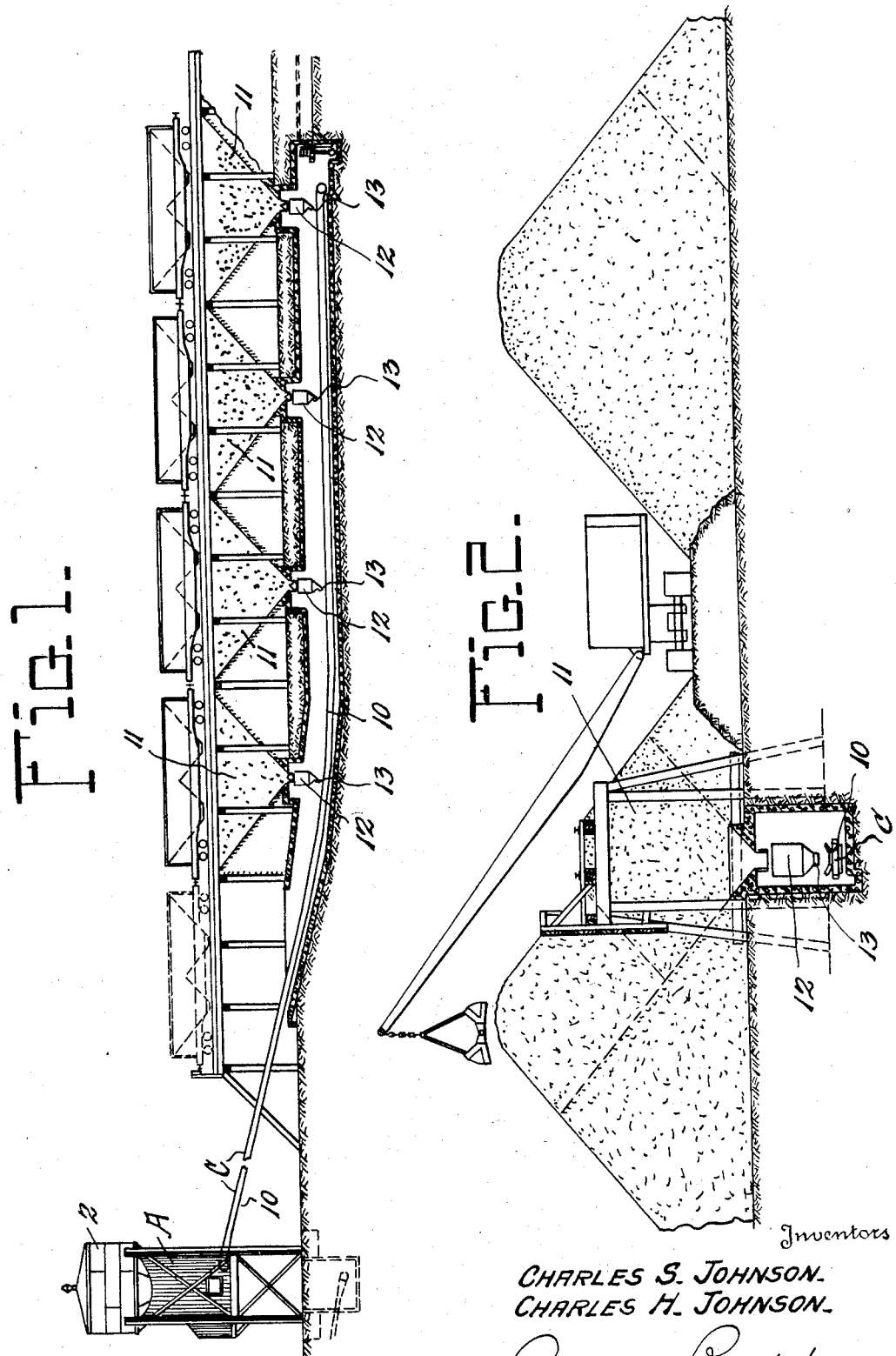
Inventors
CHARLES S. JOHNSON.
CHARLES H. JOHNSON.
By Robb&Robb
Attorneys

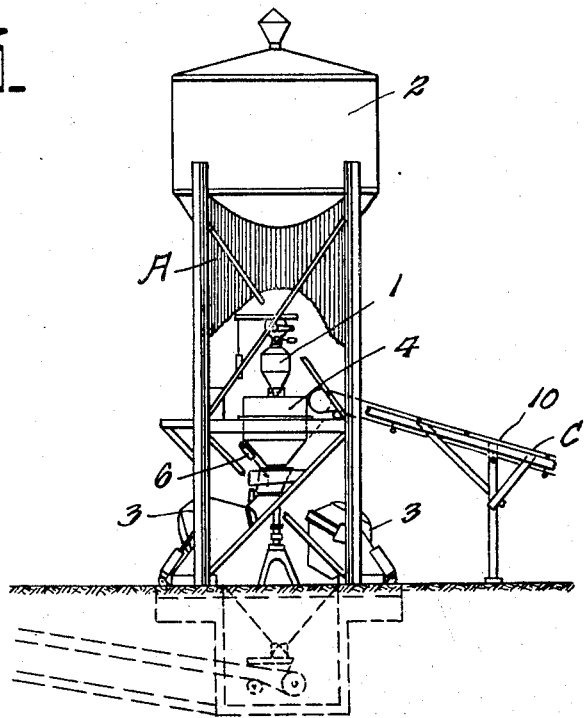
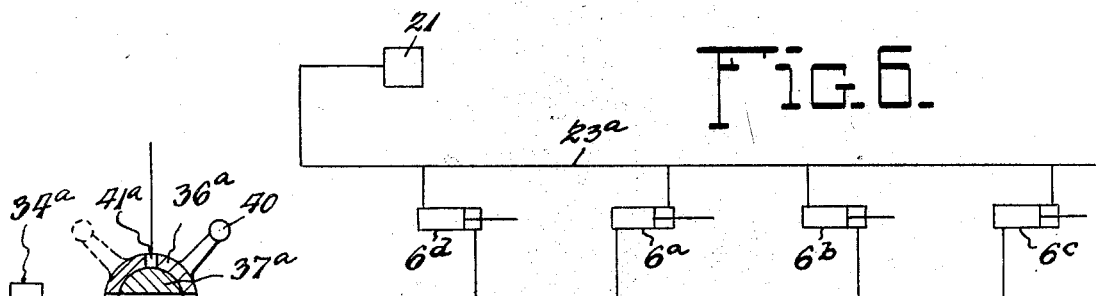
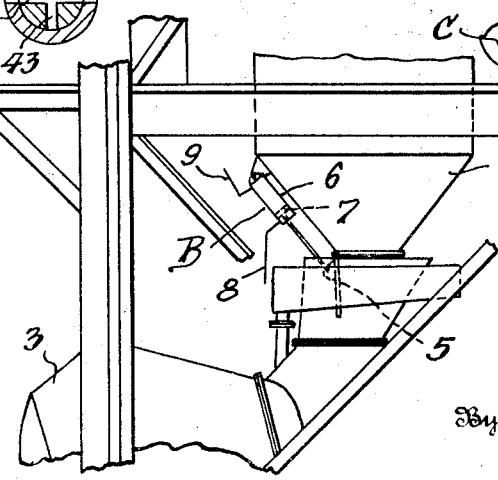

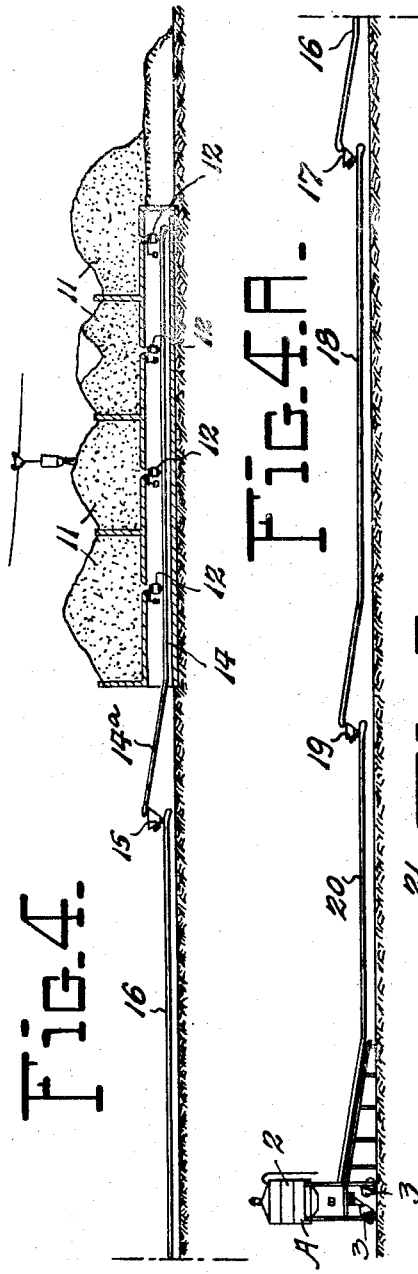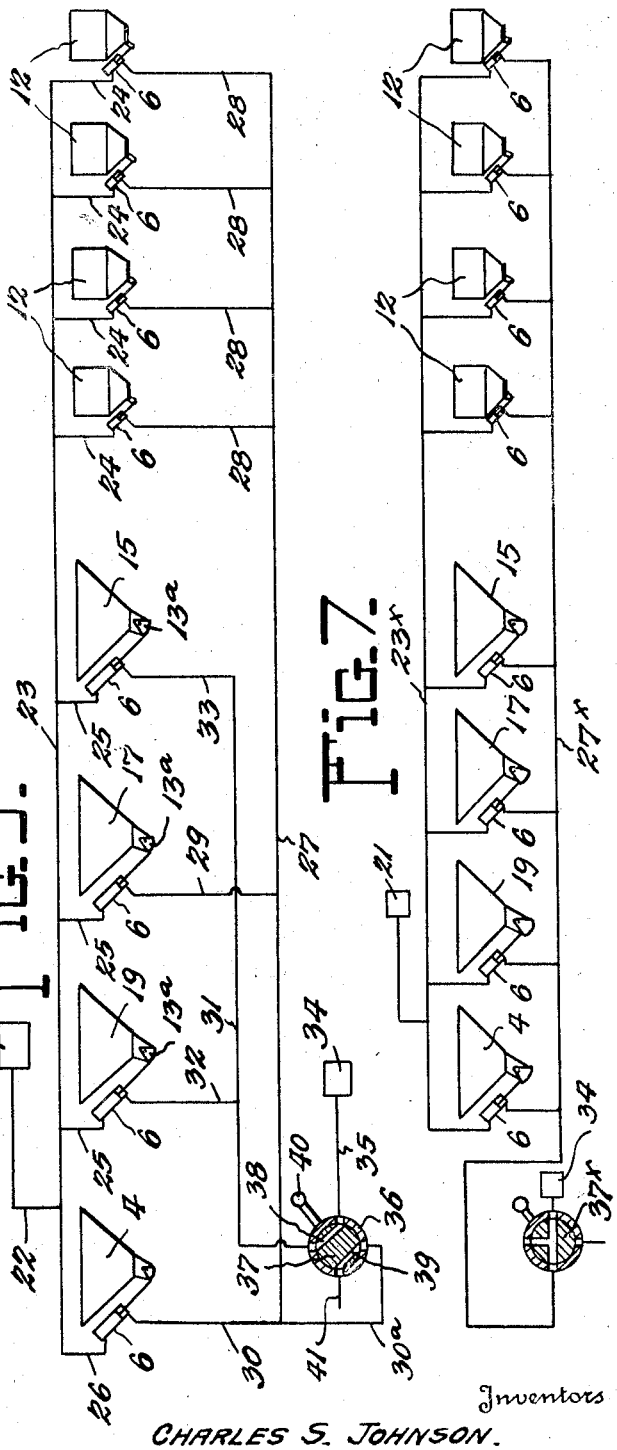

Patented Aug. 16, 1938

2,127,120

UNITED STATES PATENT OFFICE 2,127,120

BATCHER, BATCH CHARGING, AND TRANSFER SYSTEM

Charles S. Johnson and Charles H. Johnson, Champaign, Ill., assignors to The C. S. Johnson Company, Champaign, Ill., a corporation Application March 11, 1937, Serial No. 130,392

12 Claims. (Cl. 83—73)

In the art of central mixing plant operation, or central batching systems where aggregate materials are to be batched and discharged to mixers, or handled otherwise, in their batched condition, special problems arise in large installations. These large installations are usually required when huge dams or other large structures are being built and aggregate materials are to be supplied from more or less remote locations of the supply points or bins for such materials, these materials having to be brought to a central mixing plant installation of some kind where the mixing operation is performed.

In installations of the class referred to where the central mixing plant is located quite remotely from the supply sources of the different aggregates which are to be batched and conveyed to the central installation, it has been proposed heretofore to use suitable measuring batchers adjacent to the supply sources for the different aggregates. It has also been proposed to employ endless conveyor belt or like means for conveying the aggregates, from the measuring batchers at the supply points, to the central plant installation, where these batches are fed to a gated charging hopper for mixers or the like that controls the supplying of the proportioned batches in units to a mixer, or mixers, according to the size of the installation. Generally, the batchers at the supply points, the conveyor means, and the charging hopper which receives the batches at the central plant installation, are manually controlled so as to maintain a proper cycle of operation, including the depositing of the measured batches on the conveyor means, movement of the conveyor means to carry the batches of materials to the central plant installation and cause the said batches in regular order to be deposited in the gated charging hopper that supplies the materials to the mixers or other place where they are to be fed. The manual controlling actions for the various units of the system referred to are commonly separate, and coordination of operation of such units is obtained through visual observation. Of course such coordination becomes impracticable or extremely difficult when the supply points are located remotely to the central receiving batcher unit of the system.

It is the purpose of this invention, therefore, to provide a general system or installation of the type which has been above referred to, in which a continuous running belt leads from the stock piles, bins, or supply sources of the various materials to be proportioned and batched together, to the batch charging hopper located at the central mixing plant or equivalent installation, in which the control for the discharging of the batch hopper or receiver at the central mixing plant is interlocked or specially coordinated to synchronize its operation in proper relation to the operations of the various measuring batchers at the supply sources.

The foregoing represents the general concept and purpose of the present invention, but subsidiary thereto the improvements hereinafter described involve the employment, in a system such as hereinbefore characterized, of conveyor means comprising a series of separately operating conveyor belts or endless conveyors, one of which is adapted to receive the proportioned or measured materials at the supply sources, and one or more of which conveyors are disposed between said first mentioned conveyor and the batch charging hopper at the central mixing plant, which hopper is used to properly charge the mixer, or plurality of mixers in regular order. Between each of the conveyors, intermediate the supply sources, and said batch charging hopper, in which the materials are ultimately received, it is contemplated, according to one embodiment of this invention, to employ a receiving hopper capable of holding a full-sized proportioned batch of aggregates fed from the supply sources, said receiving hopper being adapted to be discharged periodically and at a time which is synchronized with respect to the operation of the batch charging hopper and the measuring hoppers at the supply source. The use of the receiving hoppers between the conveyor belt or endless conveyor units of the system, and the operation of these receiving hoppers in coordination, interlocked, so to speak, with the operation of the mixer charging hopper and the operations of the measuring hoppers at the supply sources, enable a system of belt charging and conveying of aggregate materials to be obtained which is practical for use especially where the materials have to be conducted over a long distance from the supply sources to the charging hopper. Such a system is obtained by the means of the present invention.

Summarizing, therefore, it is notable that this invention comprises primarily the association of a batch charging hopper, or like charging instrumentality, with a conveyor system involving either a single long conveyor, or a series of conveyor units and associated receiving hoppers between the units, in cooperation with the measuring hoppers at the supply sources, all of which features of the system are coordinated and interlocked in their operations to enable the obtaining of a continuously operating synchronized series of such units.

In the accompanying drawings several exemplifications by way of modified embodiments of the invention are illustrated, and the figures of the drawings may be described as follows:

Figure 1 is a somewhat diagrammatic longitudinal sectional view, with some parts shown in side elevation, of a system embodying certain general features of the invention.

Figure 2 is a cross sectional view through the system shown in Figure 1, of one of the stock pile supply sources, and showing more clearly one of the measuring hoppers.

Figure 3 is an enlarged view showing a little more clearly the features of the central mixing plant installation, more diagrammatically illustrated in Figure 1.

Figures 4 and 4a constitute virtually a combined view of a long system, including a modification of the invention in relation to the system illustrated in Figures 1 and 2.

Figure 5 is a diagrammatic view showing more fully the arrangement of measuring hoppers, receiving hoppers, each of which are located between adjacent conveyor units or belts, and main charging hopper, illustrating the common control method and mode of coordinating the opening and closing operations of these various hoppers or sets of hoppers.

Figure 6 is a view similar to Figure 5, showing a modification of the system of Figure 5 by which the control means for opening and closing the various hoppers is simplified.

Figure 7 is a view similar to Figure 5 but illustrating a further modification of the invention, involving the common control means and special control features by which the opening and closing actions of the various hoppers are effected in a synchronized order.

Figure 8 is a fragmentary detail view showing more clearly the manner of adjusting the swivel chute at the bottom of the batch charging hopper to supply a batch of materials to a mixer beneath said hopper.

The general features of the batching, belt charging and transfer system of the invention will fully be set forth. There will ordinarily be availed of the central mixing plant installation A comprising the usual features, which may include the cement batcher 1 and cement supply bin 2. At the base of the plant are the mixers 3 adapted to be charged one at a time with aggregate materials received in the receiving or charging hopper 4 at the upper open end of the latter. The charging hopper 4 is a gated hopper equipped with the bottom gate 5 that may be operated electrically by means of a solenoid actuator, or, as shown, may be actuated to open and close by an air ram B consisting of a cylinder 6 having therein a piston 7 adapted to be actuated in opposite directions by supplying air thereto through pipes or conduits 8 and 9.

The materials of a batch to be charged into any one of the mixers 3 from the hopper 4 are carried to and fed into said hopper 4 by a conveyor C consisting preferably of an endless conveyor belt 10, which belt is a single unit as illustrated in Figures 1 and 2. Located more or less remotely in relation to the central mixing plant A are the supply sources of the different larger aggregate materials such as stone of different sizes, gravel of different sizes, sand, etc. These sources of supply may be stock piles or bins, such being immaterial to the invention, and the supply sources are designated 11. The supply sources for the aggregates are disposed above the belt 10 of the conveyor C, and intermediate the supply sources and said conveyor are provided the measuring batchers 12, one for each supply source. The batchers 12 may be of any suitable type as for instance that construction involving a batch hopper associated with weighing mechanism by which the amount of materials in each batcher 12 is accurately weighed before being discharged therefrom. The accurately weighed materials in each batcher 12 may be discharged by a bottom gate 13 onto the conveyor C located beneath the said batchers. According to the embodiment of the invention in Figures 1 and 2 the operations of the batchers 12 and charging batcher 4 are coordinated and synchronized by common control means of some kind, such as will be referred to hereinafter more fully, the object of the coordination of control of the parts 12 and 4 being to prevent the discharge of the charging hopper while materials are being fed forward thereto by the conveyor C.

While in Figures 1 and 2 the supply source means of the system involves a single conveyor of the endless belt type, reference is made to Figures 4 and 4a to illustrate another type of conveyor system, which is described as follows: In Figures 4 and 4a the stock piles or supply sources are designated at 11 as before, and the measuring batchers also at 12. Beneath the supply source for batchers 12 operates the first and most remote endless conveyor 14, which receives and delivers the materials fed thereto from the batchers 12 to the batch receiver or hopper 15 beneath the upwardly inclined delivery end 14a of said conveyor 14. The batch receiver or hopper 15 is above the receiving end of the adjacent second conveyor 16, which in turn delivers the materials, deposited thereon by the batch receiver 15, into a second batch receiver 17 above the receiving end of a third conveyor belt 18. The belt or conveyor 18 delivers its materials to another batch receiver 19, and said receiver 19 is disposed above the receiving end of the conveyor or endless belt 20 that leads directly to the central mixing plant and delivers the materials in the manner shown, by the conveyor 10 in Figure 3, to the batch charger 4 of said central plant A.

Of course the conveyors in the system of Figures 4 and 4a may be of any desired number because of provisions made by the invention now to be described enabling a complete remote control and coordinating of the functions of the measuring batchers 12, the conveyors 14, 16, 18, and 20, and associated batch receivers 15, 17, 19, and 4, the charging hopper 4 being a batch receiver.

In Figure 5 the system of the invention is diagrammatically designated, with the measuring batchers 12 arranged at the right, the batch receivers 15, 17 and 19 at the middle of the system, and the mixer charging hopper or batch receiver 4 at the left where it will be a part of the installation of a central mixing plant such as A. Each of the measuring batchers, batch receivers, and the batch charging hopper 4 is equipped with an air ram such as 6—7, previously described. Differential air pressures are availed of to control the operations of the air rams for the said various measuring batchers, batch receivers, and the charging hopper 4. To this end there is diagrammatically illustrated a source of pressure, as for instance a tank or reservoir 21, wherein the pressure is maintained, for example, at 50 lbs. Leading from this tank is a conduit or pipe 22 which connects with a main line conduit or pipe 23. Branches 24 lead from the main line pipe 23 to the upper ends of the cylinder 6 of the air rams for the measuring batchers 12. Branch pipes 25 lead from the main line 23 to the upper ends of the cylinder 6 for the batch receivers 15, 17, and 19. A branch pipe or conduit 26 connects the main line 23 with the upper end of the cylinder 6 of the ram for the batch charging hopper 4. A second main line pipe or conduit 27 is connected by branches 28 with the lower ends of the cylinders of the air rams for the batchers 12. A branch pipe 29 connects the main line pipe 27 with the lower end of the cylinder 6 of the batch receiver 17, and a branch pipe 30 connects the said main line 27 to the lower end of the cylinder 6 of the ram for the hopper 4. An auxiliary air pipe line 31 is connected by a branch pipe 32 with the lower end of the cylinder 6 of the ram for the batch receiver 19, and a branch pipe 33 connects the pipe line 31 to the lower end of the cylinder 6 for the ram of the batch receiver 15.

The source of air supply or pressure to be conducted to the lower ends of the air rams for the various members 12, 15, 17, 19, and 4 above described, is diagrammatically shown in Figure 5 as a tank or reservoir 34, from which extends the pipe line 35 leading to a valve casing 36 in which is mounted the two-way valve 37. The valve 37 has two air passages 38 and 39 extending therethrough.

The system as described above in conjunction with Figure 5 may be employed in connection with the general system of batchers, batch receivers, and central mixing plant with associated conveyors, as illustrated in Figure 4.

The operation of the system in Figure 5 is as follows: The valve 37 is operable by means of a handle 40. In the position of the valve 37 in Figure 5, the air under pressure of 100 lbs. is conducted from the reservoir 34 through the port 38 to the auxiliary air line 31 and by the branches 32 and 33 to the lower ends of the air rams for the batch receivers 15 and 19. This air under pressure moves the pistons in the cylinder 6 of the rams for the receivers 15 and 19 upwardly and thereby opens the gates 13a of said two receivers 15 and 19, whereby to discharge the aggregates contained in said receivers downwardly upon the belts 16 and 20, which belts receive and carry the materials or aggregates to the batch receiver 17, and the batch charging hopper 4, respectively. When the bottom discharge gates for the receiving hoppers 15 and 19 are open, the valve passage 39 of valve 37 connects the branch line 30, by means of an exhaust line 30a connected therewith, to the exhaust port 41 of the valve casing 36, and through the provision of the branch pipe 29 and branch pipes 28 connected to the main line 27 fluid in the lower ends of the rams for the receiver 17 and the batchers 12 may be exhausted from the lower ends of the cylinders of said rams. The main air line or pipe 27 is connected to both the branch line 30 and exhaust line 30a.

When the air is exhausting from the lower ends of the rams for the receiver 17, batchers 12, and the charging hopper 4, the pistons of said rams are moved downwardly to close the bottom discharge gates for these various receptacles, under the action of the 50 lbs. air pressure supplied to the upper ends of the rams, thus maintaining the gates closed.

By reversing the position of the valve 37, as seen in Figure 5, in order that the air pressure at 100 lbs. from the reservoir 34 may enter the exhaust and feed line pipe 30a through the passage 38 and connect the passage 39 and exhaust port 41 with the auxiliary pipe line 31, a reversal of the position of the gates for the various measuring batchers, receivers and charging hopper is obtained in the following manner. The air at 100 lbs. pressure enters the lower ends of the ram for the charging hopper 4 by the branch line 30 from the exhaust and feed line 30a. Said air at this 100 lbs pressure passes into the main line 27 and enters the lower ends of the rams for the receiver 17 and the various measuring batchers 12. In this manner all of the gates for the measuring batchers 12 are caused to be open, the 100 lbs. pressure overcoming the 50 lbs. pressure supplied to the upper ends of the air rams by the pipe line 23. Thus, under the conditions stated, with the line 31 connected to the exhaust port 41, the air from the reservoir causes closing of the gates 13a for the receivers 15 and 19 at the same time that the discharge gates for the receptacles 4, 17, and 12 are opened.

Now when it is borne in mind that the system of control of Figure 5 is adapted to the arrangement of conveyors, measuring batchers, and receptacle 4, of Figure 4 installation, it will be seen that when the mixers 3 are being charged by opening of the batch charger 4, the receiver 19 nearest to the batch charger remains closed, and the belt 20 cannot feed any material to the batch charger 4. The receiver 15, being closed, is being supplied with aggregate materials by the moving conveyor 14.

When the operator closes the batcher 4 by operation of the valve 37, the receiver 19 is opened to deliver its contents to the belt 20 which carries the materials up and into the closed batch hopper 4. At the same time the receiver 15 is opened to deliver its materials or contents to the belt 16 which carries said materials or aggregates up and into the closed receiver 17.

It is noted again that when the batch charger 4 is open, the receiver 17 is open, and the measuring batchers 12 are likewise opened so that the contents of the latter will be discharged upon the first or most remotely located conveyor 14, to be conducted by the latter to the receiver 15 which is always closed when the batchers 12 are open.

In the above manner the controls for the opening and closing of the various receivers, measuring batchers, and the batch charger 4 are so interlocked as to automatically govern the proper passing of the materials along the conveyors 14, 16, 18, and 20 so as to prevent any possibility of shooting two batches or more of the aggregates onto any conveyor or into any receiver or into the batch charging hopper 4. Likewise, liability of the material being fed into the batch charging hopper 4 when it is open, or into any of the receivers 15, 17, and 19, when they are open, is avoided.

In the modification of Figure 6 a somewhat simplified arrangement of the pipe lines or conduits is employed to obtain the proper coordinated operation of the air rams for the receivers above the conveyors and the batch charger.

The receiver air rams are designated 6a, 6b, and 6c. The batch charger air ram is designated 6d. The main 50 lbs. air supply line or conduit is 23a and the second main 100 lbs. air supply conduit is designated 27a. The valve casing 36a has the exhaust port 41a, and the valve 37a in said casing has three-way passage means comprising the straight long passage 42 and a straight lateral passage 43 at right angles to the passage 42. In the position of the valve 37a in Figure 6 the air pressure at 100 lbs. from the reservoir 34a is connected by the pipe line 27a to the right-hand ends of the air rams 6d and 6b and to the left hand ends of the rams 6a and 6c. Thus, since the ram 6d controls the discharge gate for the batch charger 4, the said gate will be open and since the ram 6b controls the gate for the receiver 17, this gate will be open. The receiver 17 will thus discharge at the same time that the gate for the charging batcher is open, under the conditions stated, and likewise at such time the gate for the receiver 19 which is controlled by the ram 6a will be kept closed, and the gate for the receiver 15 which is controlled by the ram 6c will be kept closed. The pressure in the line 27a overcomes the pressure in the line 23a under the above conditions. When the valve 37a in Figure 6 is shifted to its dotted line position by movement of the handle 40, the air supply line 27a is connected to the exhaust 41a and the air supply from the 50 lbs. pressure reservoir 21 is caused to actuate the piston of the ram 6d to close the gate for the batch charger 4, open the gate of the batch receiver 19, close the gate of the batch receiver 17, and open the gate of the batch receiver 15. Thus, by using two main pipe lines, according to the Figure 6 modification, the same operation of the gates for the batch charger 4 and the receivers 15, 17, and 19 as obtained in Figure 5 disclosure may be produced. The pipe line 27a may be extended so as to lead to the lower ends of the rams for the measuring batchers 12, and the pipe line or conduit 23a may be extended so as to lead to the upper ends of the rams for said measuring batchers 12, after the manner illustrated in Figure 5.

In the modification of the invention in Figure 7, parts similar to those in Figure 5 are designated by the same reference characters. The primary difference between the construction of the systems of Figure 7 and Figure 5 resides in the fact that the pipe line or conduit 27x in Figure 7, supplies, through suitable branch lines, air under 100 lbs. pressure to the lower ends of the rams for all of the parts 4, 19, 17, 15, and 12. Likewise, the air at 50 lbs. pressure is supplied through the pipe line 23x to the upper ends of all the rams for the parts 4, 19, 17, 15, and 12. By reason of the above arrangement of connections to the cylinders 6 of the rams, it will be evident that by turning the valve 37x to one position the discharge gates for all of the receptacles 4, 19, 17, 15, and 12 will be open simultaneously, and by turning the said valve 37x to the other of its positions, the gates for the receptacles 4, 19, 17, 15, and 12 will be closed simultaneously.

When the system of Figure 7 is availed of, the various receivers 19, 17, 15, must be spaced from each other, the receiver 19 must be spaced from the batch charger 4, and the receiver 15 must be spaced from the various measuring batchers 12 sufficient distances apart to permit the conveyors to hold at least a full batch of materials or aggregates, and the manually controlled valve 37 must be operated so as to close each of the receptacles 4, 19, 17, and 15 before a batch of materials commences to feed from an adjacent conveyor into any one of said receptacles.

By the employment of the invention in accordance with the various modifications of the systems above presented, there is obtained a synchronized control of the movement of the batched materials supplied from the batchers 12, in conjunction with the batch charger at the central mixing plant and also in conjunction with all intermediate receivers or hoppers arranged along the conveyor belt or belts, thereby avoiding any possibility of overcharging any receiver or the batch charger at the central mixing plant installation by the piling up of two or more batches discharged into any one of the said receptacles. There is thus afforded a safe control for remotely placed batchers and batch receivers, a safe control of the transfer of the batches of aggregates on the conveyors or belts, and insurance against the piling up of batches at the mixer or intermediate receivers, while the batches are at the same time properly separated in transit through the control of proper spacing of the operations.

It will be also seen that by employing a series of conveyors or conveyor belts instead of a single long transfer belt or conveyor, and employing the intermediate receivers, a proportioned batch is always within convenient distance from the mixer at all times, ready to be supplied to the batch charger for such mixer or mixers, thereby eliminating delay that would occur if no intermediate receivers were used with a long length traveling conveyor. On this account the present system may be extended to remote locations where measuring batchers are disposed and no time handicap in the charging operation and mixing cycle is incurred incident to the employing of the long conveyor system.

Obviously any suitable actuating instrumentalities such as electrically controlled solenoids or the like, may be used to perform the functions of the air rams as above described.

Having thus described our invention, what we claim as new and desire to secure by Letters Patent of the United States, is—

1. In a batching, conveyor, and charging system for aggregate materials, in combination, a batch charger, batch measuring means, discharging gates for the charger and measuring means, conveyor means intermediate the charger and measuring means, and common control mechanism for operating the said discharging gates for the charger and measuring means in timed relation.

2. In a batching, conveyor, and charging system for aggregate materials, in combination, a batch charger, having a discharging gate, batch measuring means having discharging means, conveyor means intermediate the charger and measuring means, comprising a series of separate conveyor units, batch receivers intermediate said units, having discharging gates, and common control mechanism for operating all of the said discharging gates for the charger, batch receivers, and measuring means in timed relation.

3. In a batching, conveyor, and charging system for aggregate materials, in combination, mixing means, a batch charger for the mixing means, remotely located batch measuring instrumentalities, conveyor means intermediate the said batch measuring instrumentalities and the batch charger, discharge devices for the batch charger and for the batch measuring instrumentalities, and mechanism intermediate and connecting said batch discharge devices for operating same in timed relation.

4. In a batching, conveyor, and charging system for aggregate materials, in combination, mixing means, a batch charger for the mixing means, remotely located batch measuring instrumentalities, conveyor means intermediate the said batch measuring instrumentalities and the batch charger, discharge devices for the batch charger and for the batch measuring instrumentalities, and mechanism for operating said batch discharge devices in timed relation, including a single common control device.

5. In a batching, conveyor, and charging system for aggregate materials, in combination, mixing means, a batch charger for the mixing means, remotely located batch measuring instrumentalities, conveyor means intermediate the said batch measuring instrumentalities and the batch charger, discharge devices for the batch charger and for the batch measuring instrumentalities, and mechanism for operating said batch discharge devices in timed relation, comprising motors associated with the said discharge devices, and a common control device for actuating the motors aforesaid and thereby the batch discharge devices for the batch charger and batch measuring instrumentalities in timed relation.

6. In a batching, conveyor, and charging system for aggregate materials, in combination, a central plant installation comprising mixing means, a batch charger for the mixing means, a discharge gate for the batch charger, remotely located batch measuring instrumentalities, a conveyor system between the said instrumentalities and the batch charger of the mixing means, including a series of separate conveyor units, batch receivers intermediate said units to receive a batch of aggregates fed from an associated conveyor unit, discharge gates for the batch receivers to enable them to discharge their contents upon a second associated conveyor unit, discharge gates for the measuring instrumentalities, and means for synchronizing the operation of the discharge gate for the batch charger, the discharge gates for the batch receivers, and the discharge gates for the measuring instrumentalities.

7. A batching, conveyor, and charging system for aggregate materials, as claimed in claim 6, wherein the synchronizing means comprises a common control member.

8. A batching, conveyor, and charging system for aggregate materials, as claimed in claim 6, wherein the synchronizing means comprises a common control member, and a system of air pressure lines including air rams associated with the discharge gates aforesaid for the operation thereof.

9. A batching, conveyor, and charging system for aggregate materials, as claimed in claim 6, wherein the synchronizing means comprises a common control member, and a system of air pressure lines including air rams associated with the discharge gates aforesaid for simultaneously opening the discharge gates and for simultaneously closing said discharge gates.

10. A batching, conveyor, and charging system for aggregate materials, as claimed in claim 6, wherein the synchronizing means comprises a common control member, and a system of air pressure lines including air rams associated with the discharge gates aforesaid for opening certain discharge gates of the receivers while another or other discharge gates are simultaneously closed.

11. In a batching, conveyor, and charging system, in combination, a batch charger, remotely located batch measuring instrumentalities, conveyor means intermediate said charger and instrumentalities comprising a series of separate conveyor units, batch receivers intermediate the conveyor units, the most remote conveyor unit being adapted to receive materials directly from the batch measuring instrumentalities, the conveyor unit nearest to the batch charger being adapted to feed materials into said batch charger, the batch receivers being disposed so as to receive a batch of materials from a conveyor unit and discharge such batch of materials upon a second adjacent conveyor unit, discharge devices for the batch charger, receivers, and batch measuring instrumentalities, and common control mechanism for causing discharge action of said discharge devices for the various means above mentioned in timed relation such that when the batch charger is opened for discharge the adjacent discharge means for a receiver is closed.

12. A system as claimed in claim 11, wherein receivers remote from that nearest adjacent to the batch charger are opened when the batch charger is opened.

CHARLES S. JOHNSON.
CHARLES H. JOHNSON.